(12) United States Patent
Jensen

(10) Patent No.: US 12,136,899 B1
(45) Date of Patent: Nov. 5, 2024

(54) AUTOMATIC WEDGE LOADER

(71) Applicant: Terabase Energy, Inc., Berkeley, CA (US)

(72) Inventor: Soren Jensen, Corte Madera, CA (US)

(73) Assignee: Terabase Energy, Inc., Berkeley, CA (US)

( * ) Notice: Subject to any disclaimer, the term of this patent is extended or adjusted under 35 U.S.C. 154(b) by 0 days.

(21) Appl. No.: 18/143,588

(22) Filed: May 4, 2023

(51) Int. Cl.
*H02S 20/10* (2014.01)

(52) U.S. Cl.
CPC .................................. *H02S 20/10* (2014.12)

(58) Field of Classification Search
CPC ....................................................... H02S 20/10
USPC .......................................................... 248/121
See application file for complete search history.

(56) References Cited

U.S. PATENT DOCUMENTS

| | | | |
|---|---|---|---|
| 3,516,590 | A | 6/1970 | Timmerbeil et al. |
| 10,020,772 | B1 * | 7/2018 | Puri .............. H02S 10/40 |
| 10,814,464 | B2 | 10/2020 | Orchard |
| 11,683,005 | B2 * | 6/2023 | Praca ............. F24S 30/425 |
| | | | 136/246 |
| 11,976,687 | B2 * | 5/2024 | Sasidharan ........ H02S 20/10 |
| 2003/0102350 | A1 | 6/2003 | Liu et al. |
| 2007/0284385 | A1 | 12/2007 | Carraher et al. |
| 2018/0091088 | A1 * | 3/2018 | Barton ............. F24S 30/425 |
| 2019/0190440 | A1 * | 6/2019 | Kingsley ........... H02S 20/32 |
| 2019/0222163 | A1 * | 7/2019 | Jensen ............. F24S 25/33 |
| 2019/0267936 | A1 * | 8/2019 | Jensen ............. H02S 40/10 |
| 2019/0363669 | A1 * | 11/2019 | Wildman ........... F24S 25/10 |

OTHER PUBLICATIONS

International Search Report and Written Opinion of the International Searching Authority mailed Jul. 25, 2024 in related PCT application No. PCT/US2024/027574, (10 pgs).

* cited by examiner

*Primary Examiner* — Todd M Epps
(74) *Attorney, Agent, or Firm* — North Weber & Baugh; Michael North

(57) ABSTRACT

During an installation of solar panels, multiple mounting brackets are attached to solar panel frames. An installer may use a wedge through module frame and mounting bracket slots to securely attach a mounting bracket to a panel frame. A typically installation process is implemented manually with a wedge loaded individually for installation. The cost-effectiveness of this approach works fine within smaller solar deployments but struggles to cost-effectively scale to large solar systems as described below. Embodiments of automatic wedge loading are disclosed for solar panel installation with improved efficiency. The implementation of automatic wedge loading provides an easy and streamlined method to reload wedges on an installation tool. An installer may continue installation process almost un-interruption with ample loaded wedge magazines.

20 Claims, 15 Drawing Sheets

AUTOMATIC WEDGE LOADER

TECHNICAL FIELD

The present disclosure relates generally to an automatic wedge loader. More particularly, the present disclosure relates to an automatic wedge loader that facilitates an on-site installation process for a solar panel assembly for improved efficiency.

BACKGROUND

The importance of solar power systems is well understood by one of skill in the art. Government agencies and companies are scaling the size and number of solar solutions within their energy infrastructure. This transition from traditional fossil fuel energy systems to solar energy solutions presents several challenges. One challenge is cost-effective management of the construction process and the ability to improve on-site installation efficiency during the construction process.

Large-scale solar panel systems typically include thousands of solar panels that are located across a multi-acre terrain and that are electrically coupled to provide a source of energy. These large-scale systems are often located in remote areas and require a significant investment in materials, resources, and labor for on-site installation. It can be very challenging to maintain consistent installation processes at each point of installation within a construction site across large areas. These issues further contribute to an increase in the cost and complexity of what is already a very cost-sensitive process.

In a typical installation process, multiple solar panels are securely aligned and attached to a shaft or torque tube to form a row of solar panels. A solar farm may comprise one or more solar arrays, with each solar array having multiple rows of solar panels. A row of solar panels may be supported by ground piles with the torque tube securely fastened to ground piles in a desired rotational angle such that the solar panels are oriented for maximum energy production efficiency.

To attach a solar panel to a torque tube, an installer may need to attach multiple mounting brackets to the panel frames of the solar panel. Both the mounting brackets and the panel frames may have slots such that the mounting brackets may be aligned to a desired mounting position. An installer may use a wedge through the slots to securely attach a mounting bracket to a panel frame. A typically prior-art installation process is implemented manually by an installer, who may need to load a wedge individually for installation. The cost-effectiveness of this approach works fine within smaller solar deployments but struggles to cost-effectively scale to large solar systems as described below.

What is needed are systems, devices and methods that improve the efficiency for wedge loading to facilitate an on-site installation of large-scale solar panel systems.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that the description is not intended to limit the scope of the invention to these particular embodiments. Items in the figures may be not to scale.

DETAILED DESCRIPTION OF EMBODIMENTS

Figure 1:
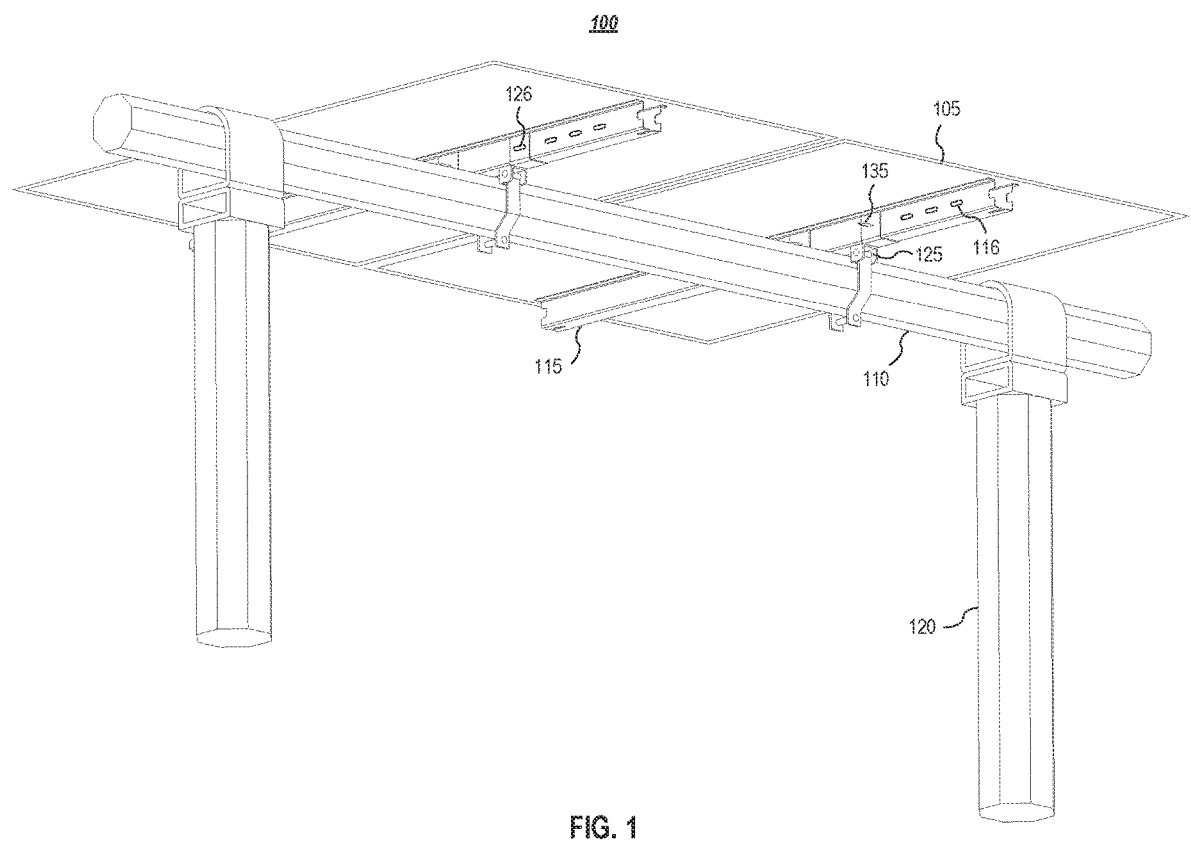
FIG. 1 shows an installation of solar panels on a construction site in accordance with various embodiments of the invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method.

Components, or features, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in a variety of mechanical structures supporting corresponding functionalities of the automatic wedge loader.

Furthermore, connectivity between components or systems within the figures are not intended to be limited to direct connections. Also, components may be integrated together or be discrete prior to construction of an automatic wedge loader.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A component, function, or structure is not limited to a single component, function, or structure; usage of these terms may refer to a grouping of related components, functions, or structures, which may be integrated and/or discrete.

Further, it shall be noted that: (1) certain components or functionals may be optional; (2) components or functions may not be limited to the specific description set forth herein; (3) certain components or functions may be assembled/combined differently across different wedge loaders; and (4) certain functions may be performed concurrently or in sequence.

Furthermore, it shall be noted that many embodiments described herein are given in the context of the assembly and installation of large numbers of solar panels within a system, but one skilled in the art shall recognize that the teachings of the present disclosure may apply to other large and complex construction sites in which resources and personnel are difficult to manage and accurately predict. Additionally, embodiments of an automatic wedge loader may be implemented in smaller construction sites or construction sites for applications other than solar farms.

In this document, "large-scale solar system" refers to a solar system having 1000 or more solar panels. The word "resources" refers to material, parts, components, equipment or any other items used to construct a solar table and/or solar system. The term "solar panel" refers to a structural assembly comprising one or more photovoltaic (PV) modules and/or one or more panel frames (or purlins) for PV module support. Some types of solar panels may have electrical harnesses and supplemental structure that allows them to connect to other solar panels or foundations/piles while other types do not have this supplemental structure.

FIG. 1 shows an installation of solar panels in a construction site in accordance with various embodiments of the invention. Multiple solar panels 105 are securely aligned and attached to a shaft or torque tube 110 to form a row of solar panels, which are supported by ground piles 120. The torque tube is securely fastened to the ground piles and may be fixed in a desired rotational angle or be rotatable during operation such that the solar panels can operate continually under maximum energy production efficiency. To securely attach a solar panel to a torque tube, one or more panel frames (or rails) 115 of the solar panel are firmly connected to a mounting bracket 125, which is firmly clamped or coupled to the torque tube 110. The panel frame 115 has multiple sets of slots 116, and the mounting bracket 125 has at least one set of slots 126. The mounting bracket 125 may be aligned to a desired mounting position and be securely attached to a panel frame 115 using a wedge 135 through the slots of the mounting bracket 125 and the panel frame 115.

The wedge installation process is typically implemented on-site by an installer. Traditionally, an installer needs to load a wedge individually for installation and then reload another wedge manually for the next installation. This individual wedge-loading approach limits the efficiency of solar panel installation and thus increases the installation cost.

Figure 2:
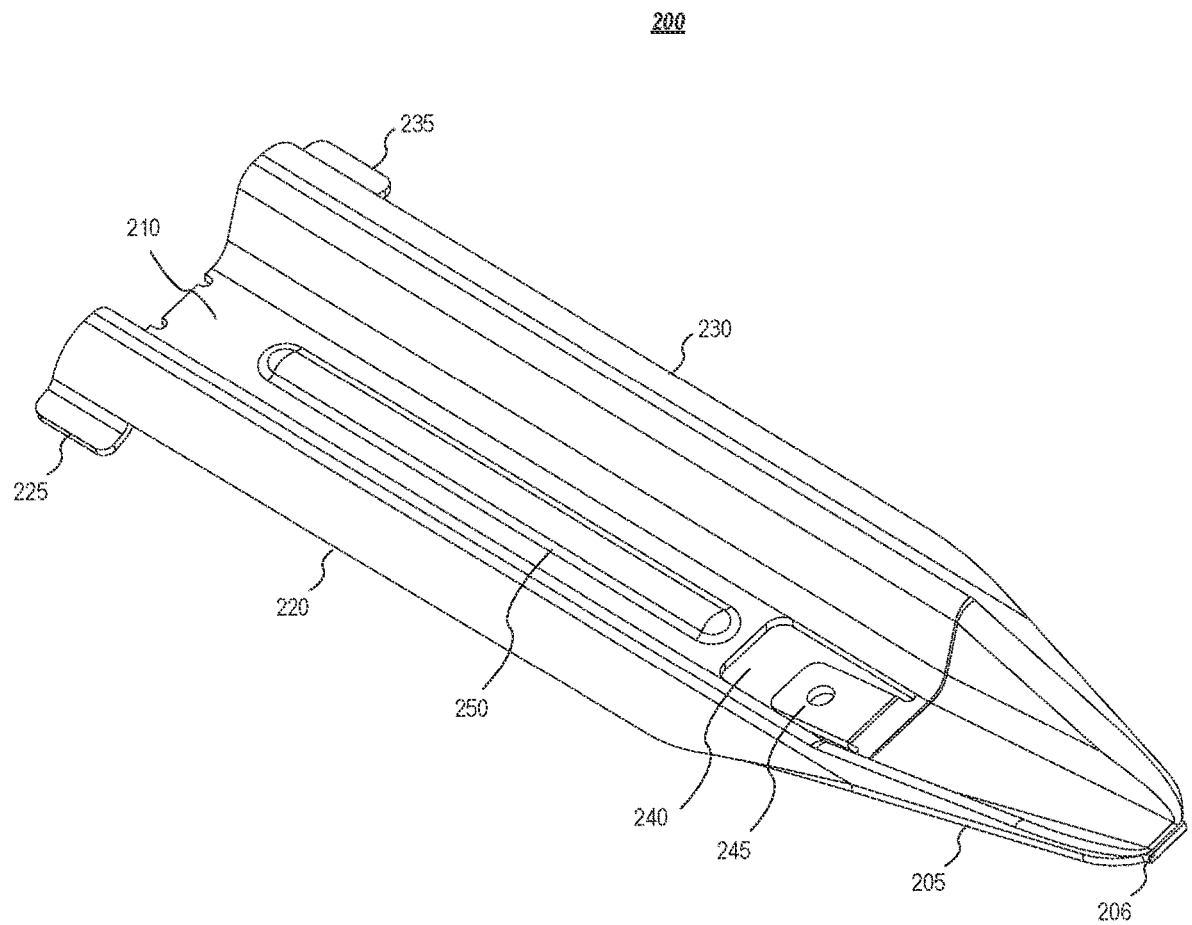
FIG. 2 is a perspective view of a wedge for securing a mounting bracket to a purlin of a solar panel in accordance with various embodiments of the invention.

FIG. 2 provides a perspective view of a wedge for securing a mounting bracket to a solar panel frame in accordance with various embodiments of the invention. The wedge 200 comprises a tapered wedge head 205, which narrows towards a leading wedge end 206, and a wedge body 210 that has an open-curve cross-sectional shape, e.g., a U-shape. The wedge body 210 has a first longitudinal wing 220 and a second longitudinal wing 230 that extend outward. The first longitudinal wing 220 and the second longitudinal wing 230 respectively have a first tail protrusion 225 and a second tail protrusion 235, which protrude cross-sectionally beyond the longitudinal wings.

In one or more embodiments, the wedge body 210 may have an opening 240 in proximity of the tapered wedge head 205 and a clip 245, protruding from the opening, slightly beyond the wedge body 210 in a normal state and extending in a direction away from the tapered wedge head 205. The clip 245 may be compressed inwardly in a compressed state when the wedge is pushed through a slot. Once the clip 245 passes the slot, the clip emerges from the compressed state and prevents the wedge from backing out of the slot. The clip and the first and second tail protrusions may jointly lock the wedge in an engaged position and prevent the wedge from moving away forwardly or backwardly from the engaged position.

The wedge 200 may be made of hard metal or alloy, such as steel or zinc-coated steel, for long-term durability. The wedge body 210 may have a cross-section slightly larger than a slot. When the wedge 200 is pushed across the slot, the first longitudinal wing 220 and the second longitudinal wing 230 may be compressed inwardly by the slot. Such compression may prevent the wedge 200 from sliding along the slot and thus hold the wedge 200 still once the wedge 200 is engaged. The wedge 200 may further comprise a reinforcing rib 250 longitudinally placed on the wedge body 210 to increase the stiffness of the wedge 200.

In one or more embodiments, the clip 245 may extend in a direction perpendicular to the longitudinal wings 220 and 230, as shown in FIG. 2. Such an offset arrangement ensures that the locking mechanisms of wing compression and clip extrusion may function in synergy for optimized wedge locking. One skilled in the art will recognize that the wedge may be modified and/or supplemented with a variety of structural and function elements to further assist in wedge locking.

Described hereinafter are embodiments of automatic wedge loading for solar panel installation with improved efficiency. The implementation of automatic wedge loading provides an easy and streamlined method to reload wedges on an installation tool. As a result, an installer may continue the installation process almost un-interruption with ample loaded wedge magazines.

Figure 3:
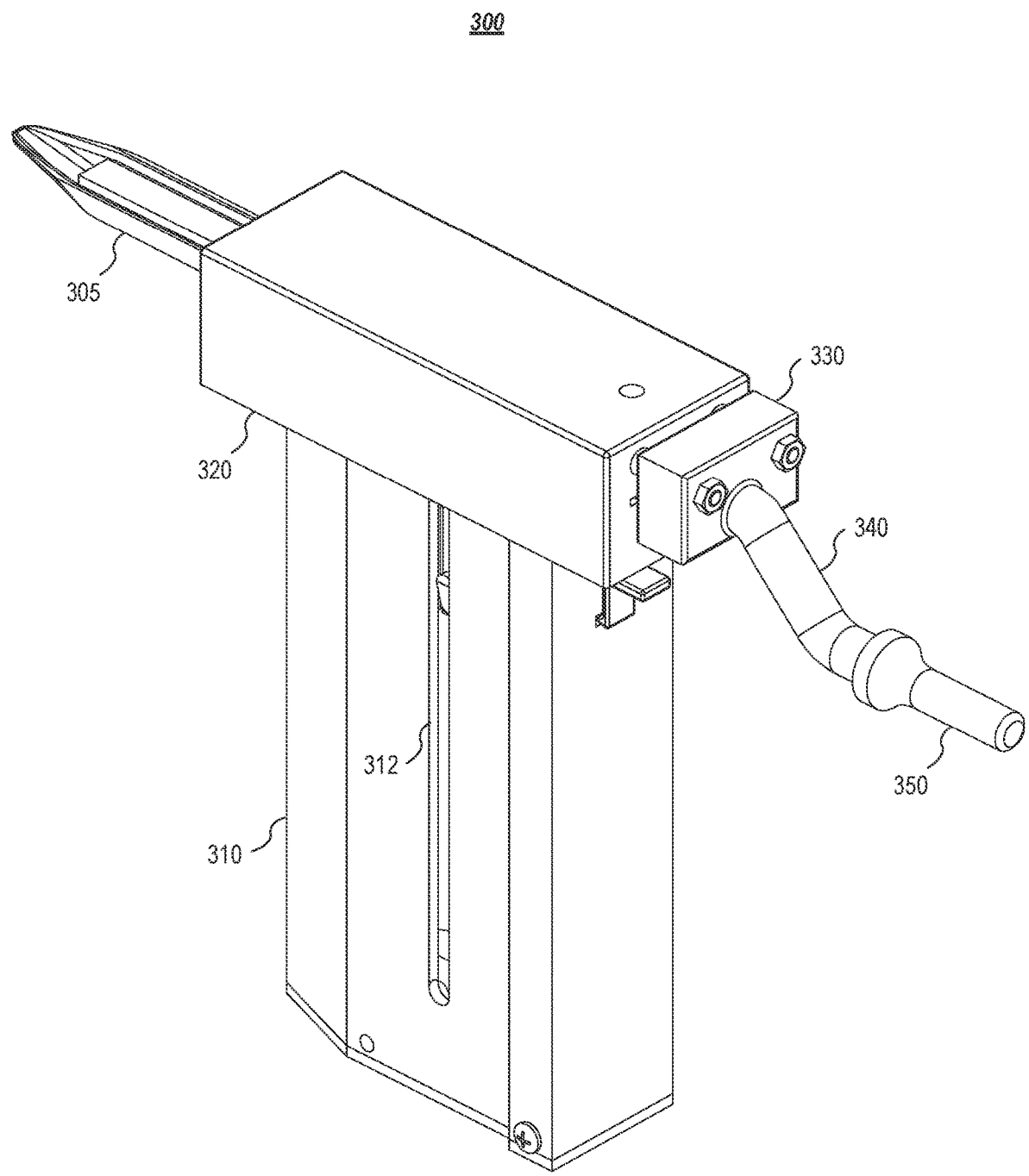
FIG. 3 depicts a perspective view of an automatic wedge loader in accordance with various embodiments of the invention.
Figure 4:
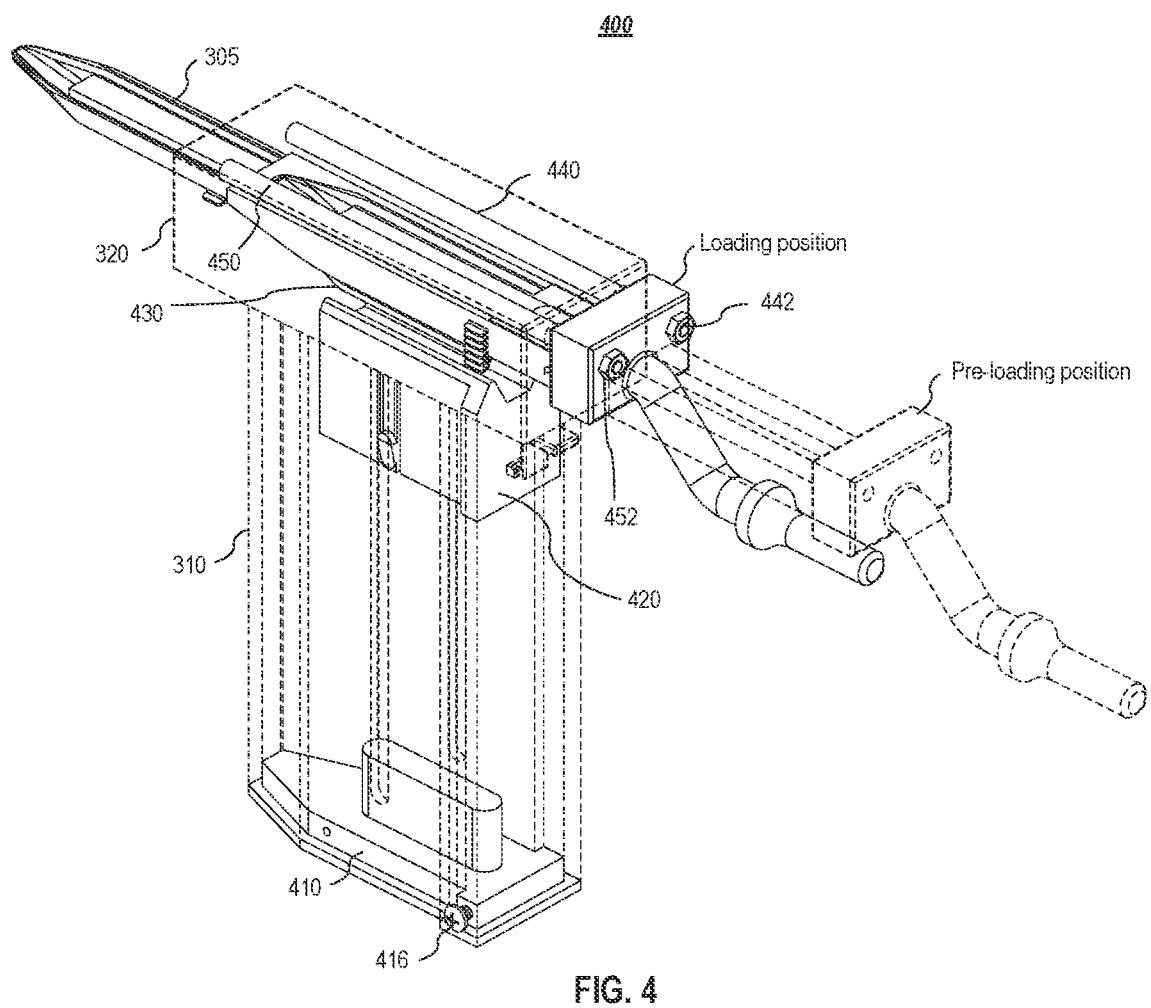
FIG. 4 depicts a transparent view of an automatic wedge loader in accordance with various embodiments of the invention.

FIG. 3 and FIG. 4, respectively, depict a perspective view and a transparent view of an automatic wedge loader in accordance with various embodiments of the invention. The automatic loader comprises a wedge magazine 310 storing a wedge stack 430, a loader head 320, a wedge transporter 330 that is used to push a wedge 305 out of the wedge magazine 310, and a pushing shaft 340. The wedge transporter 330 may have reciprocating motion (as shown in FIG. 4), driven by the pushing shaft 340, between a pre-loading position and a loading position to repetitively push wedges out of the wedge magazine 310 for wedge installation. In one or more embodiments, a driving shaft 350 may rotatably couple to the pushing shaft 340, which may be driven by an impact hammer, a rotary hammer, an air hammer, or even manually with a rubber mallet.

The wedge magazine 310 has a magazine base 410 that may be pivotably or removably attached for wedge magazine opening or sealing. In one or more embodiments, the wedge magazine 310 further comprises a wedge follower 420 to support the wedge stack 430. The wedge follower 420 is pushed or pulled toward the loader head 320 such that the wedge stack 430 may be held in position for loading. Various mechanisms may be implemented to hold the wedge follower in position. For example, one or more compressed springs may be used between the magazine base 410 and the wedge follower 420 to push the wedge follower 420 toward the loader head 320. Alternatively, one or more stretched springs may be used between the loader head 320 and the wedge follower 420 to pull the wedge follower 420 toward the loader head 320.

Figure 5:
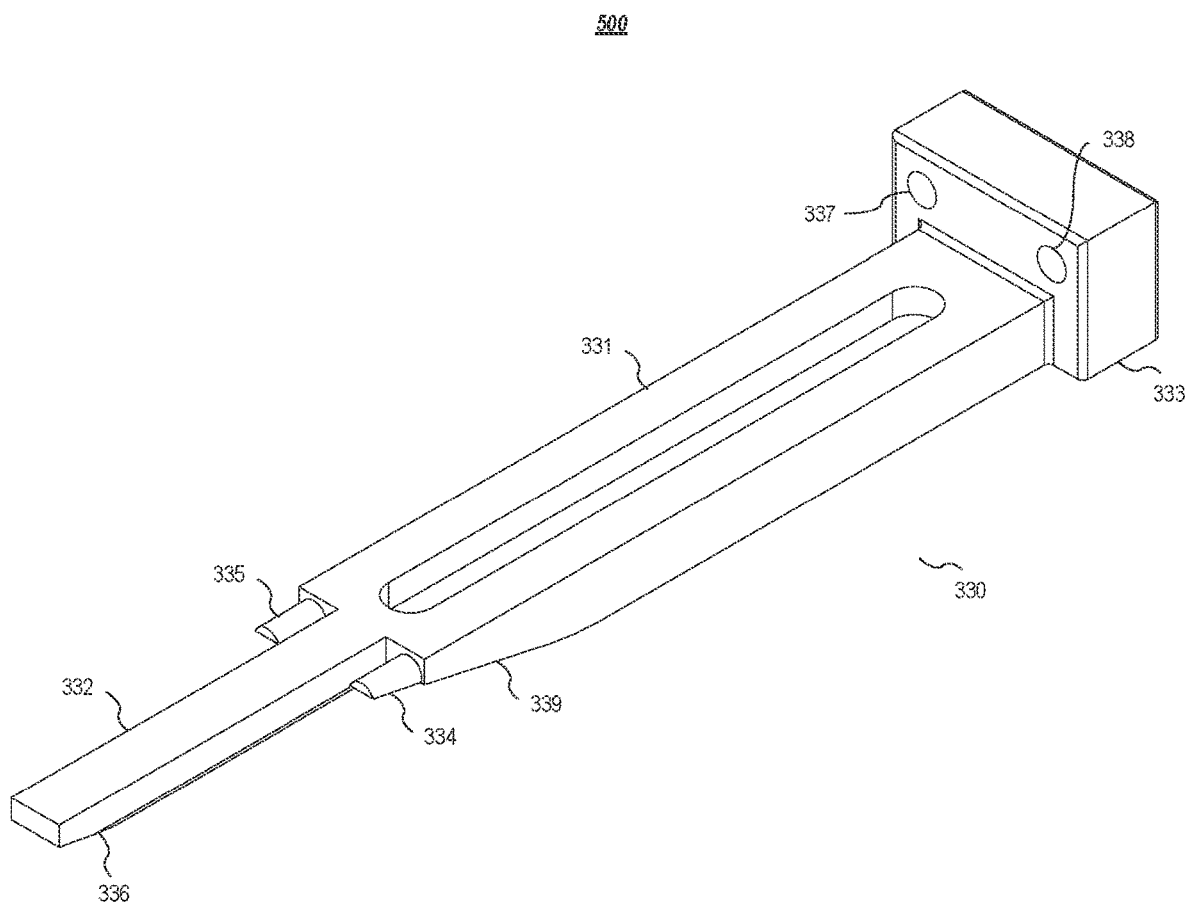
FIG. 5 depicts a perspective view of a wedge transporter with a top-holding transporter guide in accordance with various embodiments of the invention.
Figure 6A:
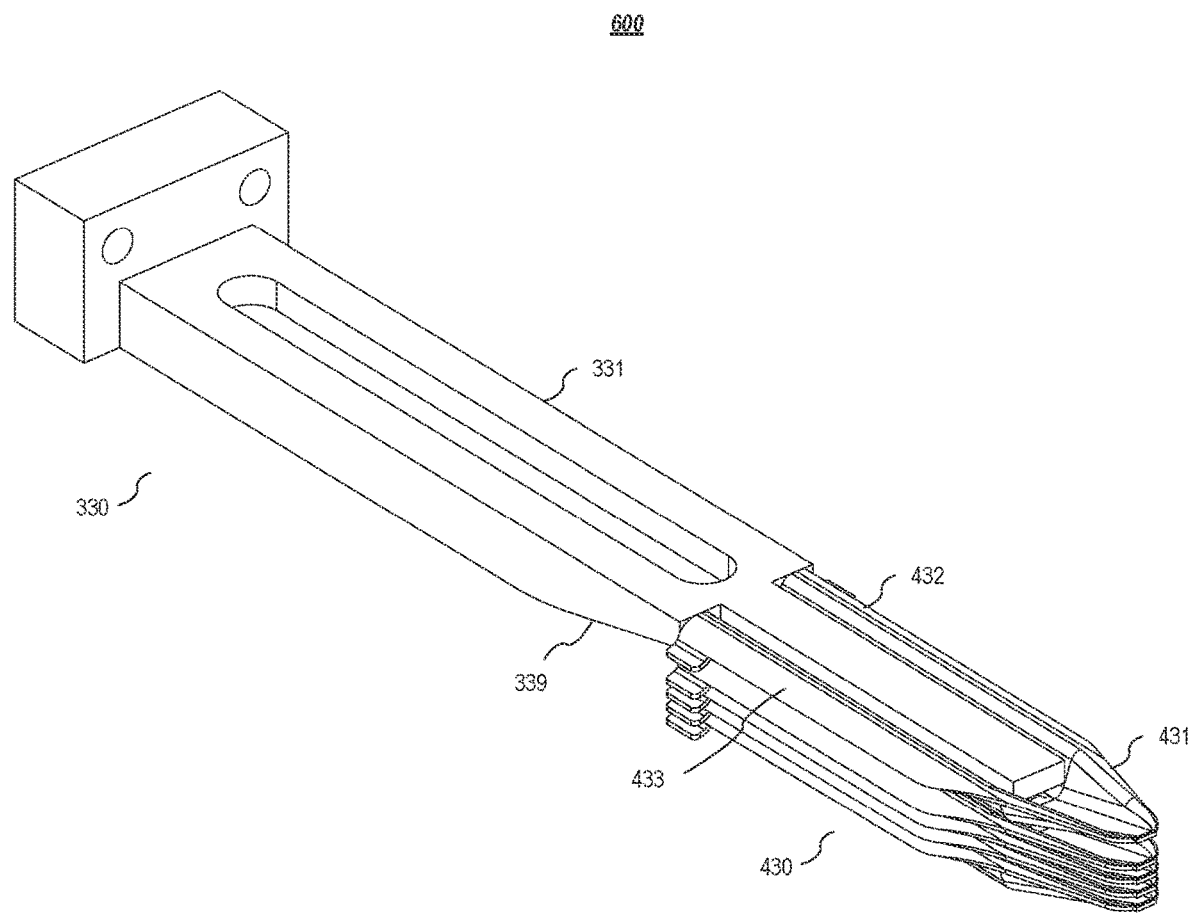
FIG. 6A is a top perspective view of a wedge transporter with a stack of wedges in accordance with various embodiments of the invention.
Figure 6B:
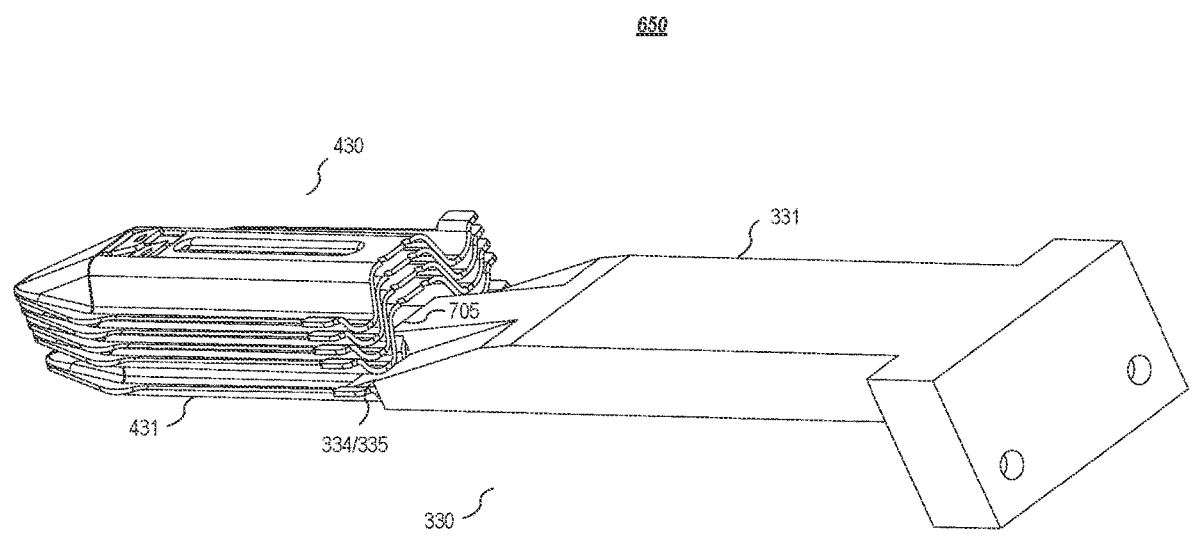
FIG. 6B is a bottom perspective view of a wedge transporter with a stack of wedges in accordance with various embodiments of the invention.
Figure 7:
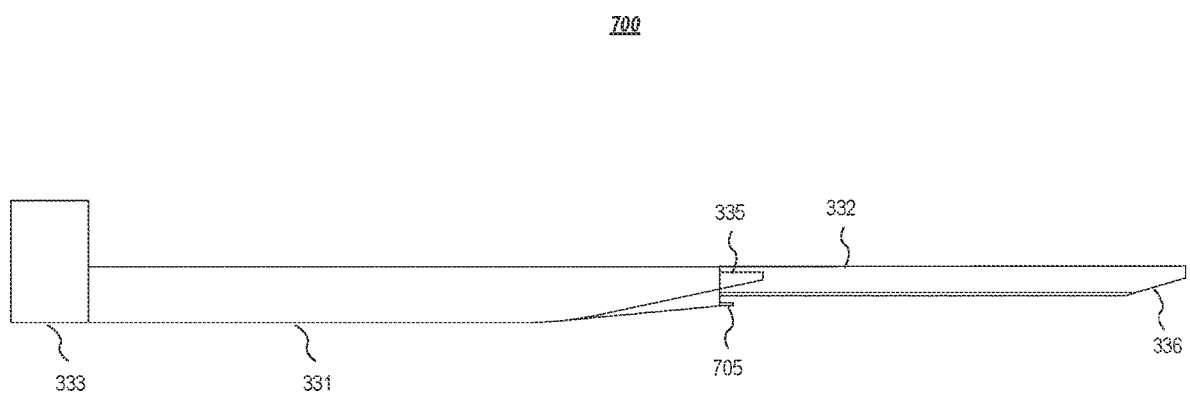
FIG. 7 is a side view of a wedge transporter in accordance with various embodiments of the invention.
Figure 13:
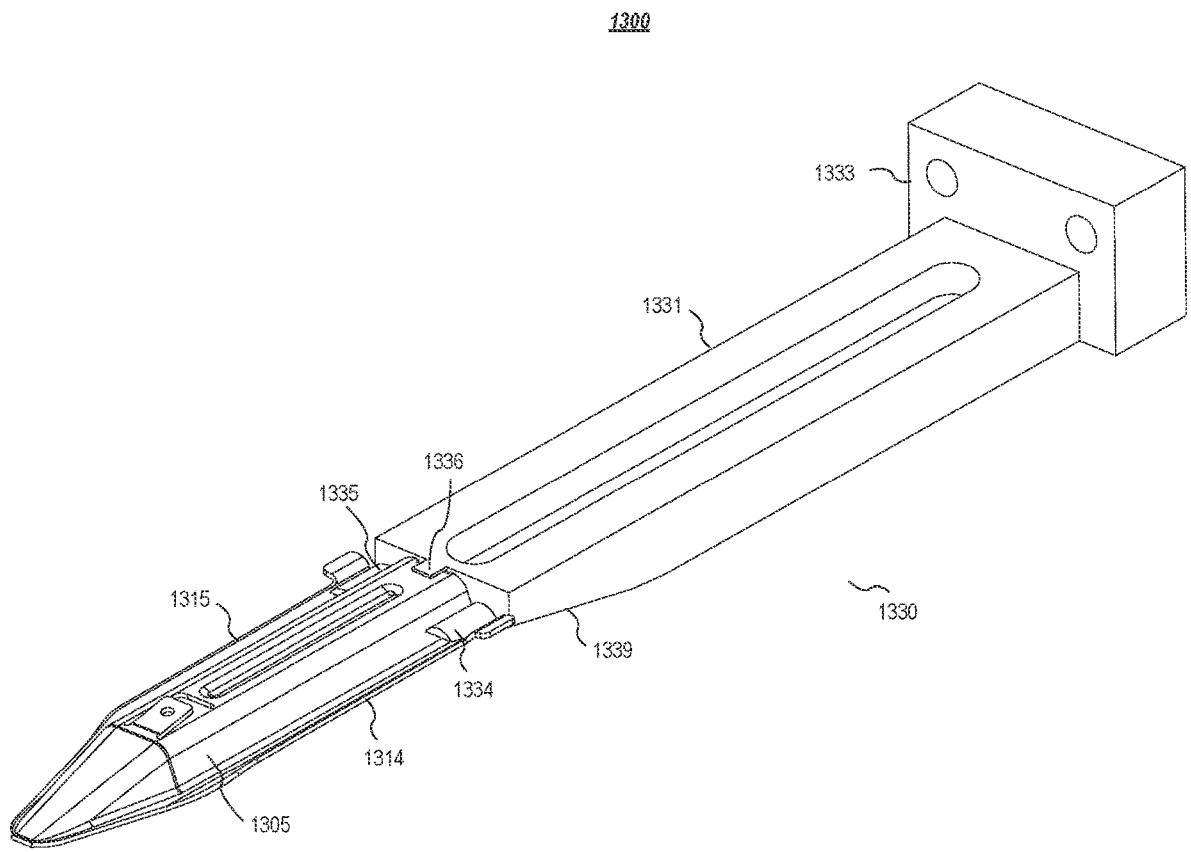
FIG. 13 is a perspective view of a wedge transporter with a bottom-holding transporter guide in accordance with various embodiments of the invention.
Figure 14:
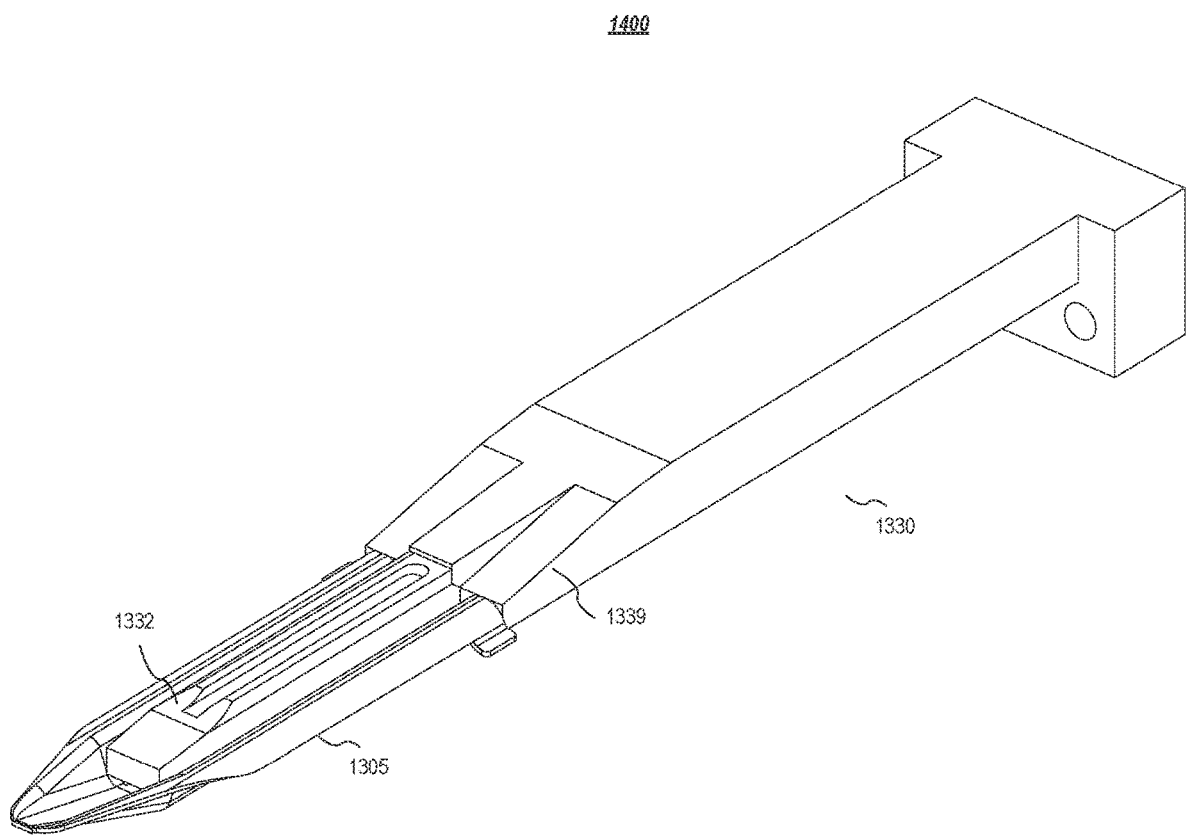
FIG. 14 is a perspective view of a wedge transporter with a bottom-holding transporter guide in accordance with various embodiments of the invention.

FIG. 5 and FIGS. 6A-6B depict a perspective view of a wedge transporter without and with a stack of wedges in accordance with various embodiments of the invention. FIG. 7 depicts a side view of the wedge transporter in accordance with various embodiments of the invention. The wedge transporter 330 comprises a transporter body 331, a transporter guide 332, and a transporter guide base 333. The transporter guide 332 may have a cross-section matching the open-curve cross-sectional shape of the wedge body 210 such that the transporter guide 332 may hold the top wedge 431 of the wedge stack 430 stably during installation. In the perspective view (a view from bottom) of a wedge transporter shown in FIG. 6B, the top wedge 431 becomes the bottom wedge of the wedge stack 430. The transporter guide 332 may also have a tapered tip 336 to ease an initial pre-loading of the top wedge 431. One skilled in the art shall understand that the wedge may be stacked differently, e.g., stacked upside down in a wedge stack, as shown in FIGS. 13-14. The wedge transporter may also have a different configuration, as shown in FIGS. 13-14, to pick up the top wedge from a stack of wedges that are placed upside down.

The transporter body 331 may have a first wedge wing holder 334 and a second wedge wing holder 335 disposed on both sides of the transporter guide 332. The first wedge wing holder 334 and the second wedge wing holder 335 support a first wedge wing 432 and a second wedge wing 433 of the top wedge 431, respectively, while the transporter guide 332 holds the top wedge 431 from above. Accordingly, the top wedge 431 may be held from above and below for stable support. In one or more embodiments, the first wedge wing holder 334 and the second wedge wing holder 335 are tapered with a thickness gradually becoming less toward a leading edge such that both wedge wing holders are able to penetrate through small wedge gaps in the stack of wedges to support the top wedge from below.

Figure 8:
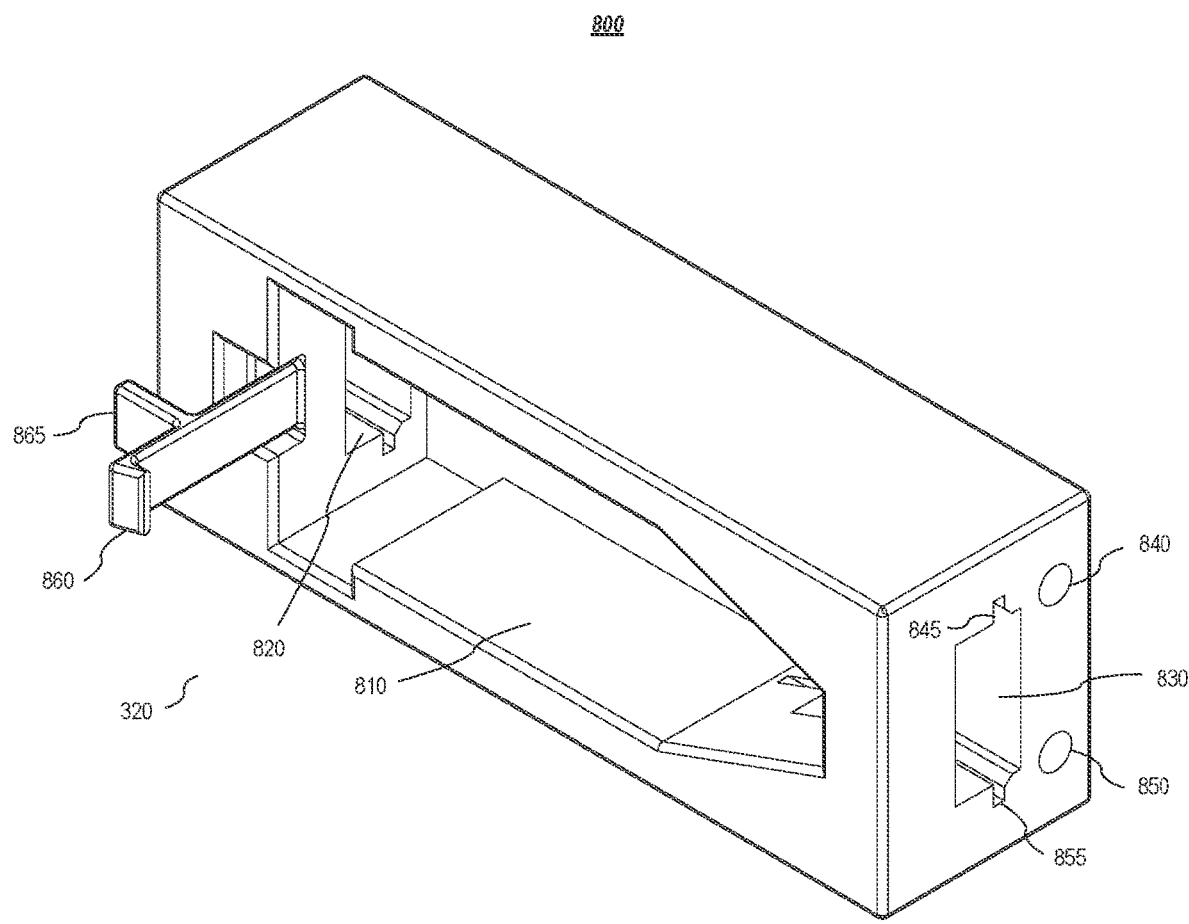
FIG. 8 is a perspective view of a loader head in accordance with various embodiments of the invention.

In one or more embodiments, the transporter body 331 has a tapered section 339 in proximity of the transporter guide 332. The tapered section 339 gradually becomes thinner toward the transporter guide 332 and may even be flush with the transporter guide 332 at a tapered section-transporter guide connection. During an installation process after the top wedge is loaded on the wedge transporter 330, the transporter body 331 only pushes the top wedge out of the magazine and the tapered section 339 may also apply a downward force to keep other wedges in the stack, especially a second wedge right beneath the top wedge, in place. Furthermore, the loader head 320 has built-in grooves 845/855 (as shown in FIG. 8) which also keep the second wedge in place in the magazine. Those grooves align with the longitudinal wings 220/230 of the top wedge 305, and thus only allow the top wedge to slide out laterally. Such a configuration further helps keep the second wedge from moving laterally in the magazine.

To enable a reciprocating motion of the wedge transporter 330 between a pre-loading position and a loading position, a first opening 337 and a second opening 338 may be incorporated in the transporter guide base 333 to respectively allow a first linear motion shaft 440 and a second linear motion shaft 450 passing through. The linear motion shafts may be partially threaded such that they can be securely attached to the transporter guide base 333 using nuts 442/452. The linear motion shafts may move linearly in corresponding slots in the loader head 320.

FIG. 7 depicts a side view of the wedge transporter in accordance with various embodiments of the invention. In one or more embodiments, the tapered section 339 may comprise a lip 705 (also referred to as a retention hook) disposed beneath the transporter guide 332. When the wedge transporter 330 pre-loads the top wedge 431, the lip 705 is right below the top wedge 431 to provide a support underneath. Such an underneath support together with supports from the wedge wing holders 334/335 and the transporter guide 332 jointly offer comprehensive wedge support. Considering that there will be shaking or vibration inevitably during the wedge installation process, such comprehensive wedge support is very advantageous in holding the wedge stable in position. Furthermore, the tapered section 339 and the wedge wing holders 334/335 may distribute the impact from an impact hammer more uniformly to the wedge. The lip 705 furthermore supports the top wedge and helps separate the top and the second top wedge from each other, and thus facilitating a clean separation of the top wedge 431 from other wedges in the wedge stack 430, as indicated in FIG. 6B.

FIG. 8 is a perspective view of a loader head 320 in accordance with various embodiments of the invention. The loader head comprises a cavity 810 where the magazine is loaded, a wedge transporter input slot 820 for receiving the wedge transporter 330, and a wedge exit slot 830 to allow a wedge to be pushed out for installation. The cavity 810 may or may not have a shape similar to the shape of a wedge. The cavity 810 that has an opening shape matching the wedge. The loader head may further comprise a first shaft slot 840 and a second shaft slot 850 to enable linear motion of linear motion shafts 440/450. The cavity 810, the wedge transporter input slot 820, and the wedge exit slot 830 are all connected to allow desired movement for the wedge transporter and wedges.

The loader head 320 may further comprise a first guide grove 845 and a second guide grove 855 to support the longitudinal wings 220/230 and the tail protrusion 225/235 of the top wedge as it is moving through the wedge exit slot 830 for installation.

The loader head 320 may further comprise at least one head clip 860 which may be used to secure the loader head 320 to the wedge magazine 310. In one or more embodiments, the head clip 860 has a built-in release handle 865, which may be pressed to release the head clip 860 for de-attaching the loader head from the wedge magazine 310. Although FIG. 8 shows a clip embodiment for loader head attachment/de-attachment, one skilled in the art will understand that various other embodiments, such as bolt screwing, etc., may also be used for loader head attachment/de-attachment.

Figure 9:
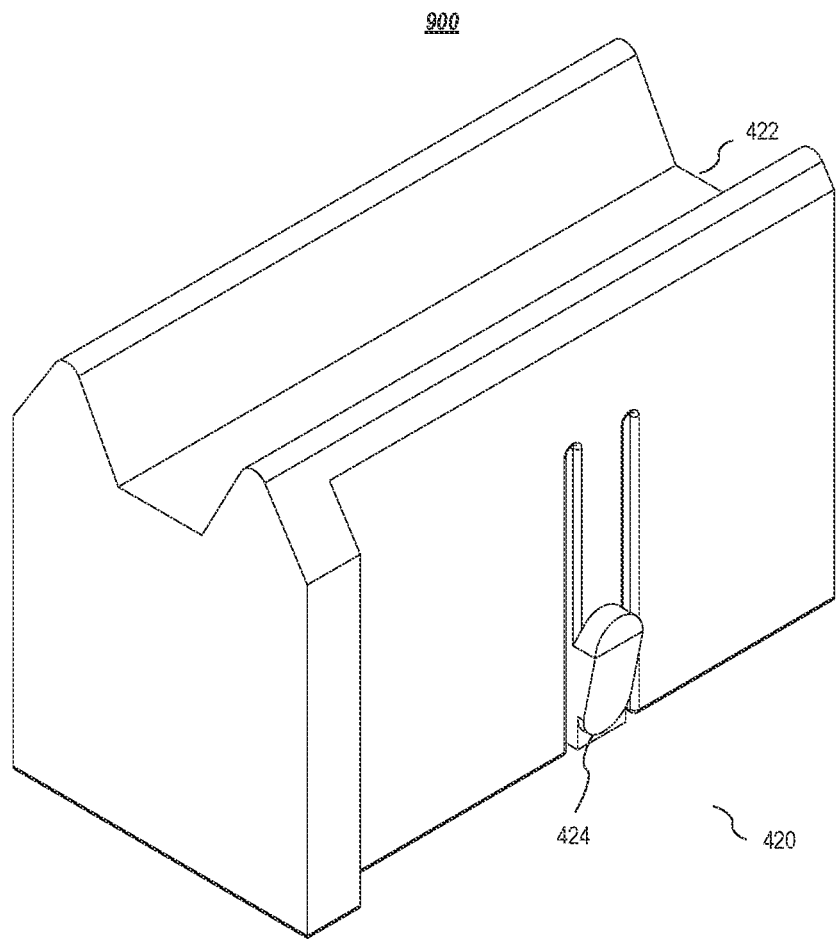
FIG. 9 is a perspective view of a wedge follower in accordance with various embodiments of the invention.

FIG. 9 is a perspective view of a wedge follower in accordance with various embodiments of the invention. The wedge follower 420 has a top groove 422 which has a cross-sectional shape, e.g., a U-shape, to match the wedge body for stable stack support. The wedge follower 420 may further comprise at least one side clip 424 that fits in a sliding slot 312 (shown in FIG. 3) on the wedge magazine 310 to allow and guide the wedge follower 420 to slide up or down.

Figure 10:
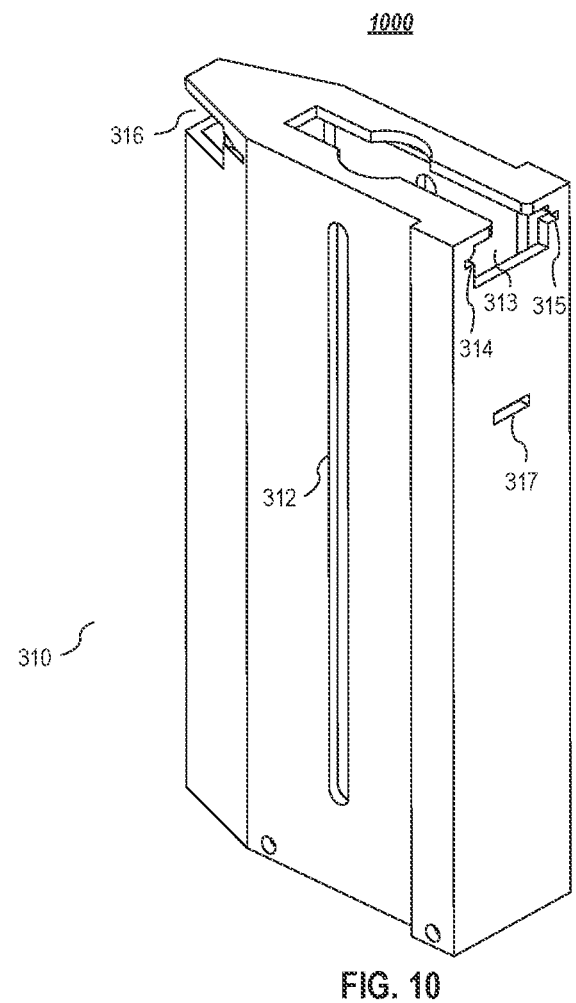
FIG. 10 is a perspective view of a wedge magazine in accordance with various embodiments of the invention.

FIG. 10 is a perspective view of a wedge magazine 310 in accordance with various embodiments of the invention. A sliding slot 312 is disposed on the wedge magazine 310 to lock the wedge follower 420 laterally but allow the wedge follower 420 to slide up or down. Similar to the loader head, the wedge magazine 310 comprises an input slot 313 for receiving the wedge transporter 330, and an wedge exit slot 316 to allow a wedge to be pushed out for installation. The input slot 313 may further comprise a first input grove 314 and a second input grove 315 to to support the longitudinal wings 220/230 and the tail protrusion 225/235 of the top wedge as it is moving through the wedge exit slot 830 for installation. The wedge magazine 310 may further comprise an opening 317, which is used to receive the head clip 860 and secure the loader head 320 to the wedge magazine 310.

Figure 11:
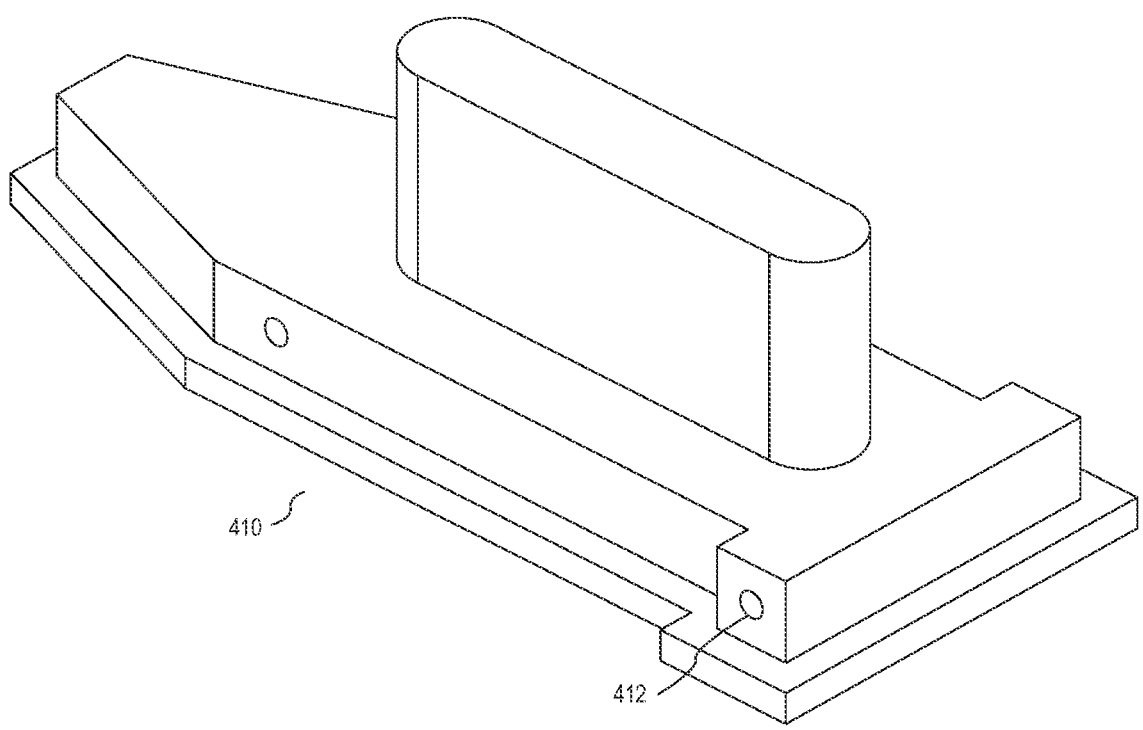
FIG. 11 is a perspective view of a wedge magazine base in accordance with various embodiments of the invention.

FIG. 11 is a perspective view of a wedge magazine base 410 in accordance with various embodiments of the invention. The wedge magazine base 410 may be removably or pivotably attached to the wedge magazine 310. A wedge loader operator may open the wedge magazine base 410 to reload another wedge stack once the current wedge stack inside the magazine is used up. As shown in FIG. 10, the wedge magazine base 410 may have one or more threaded slots 414 to receive one or more screws 416 (as shown in FIG. 4) for securing the wedge magazine base 410. Alternatively, the magazine base may also be secured with one or more clips.

Figure 12:
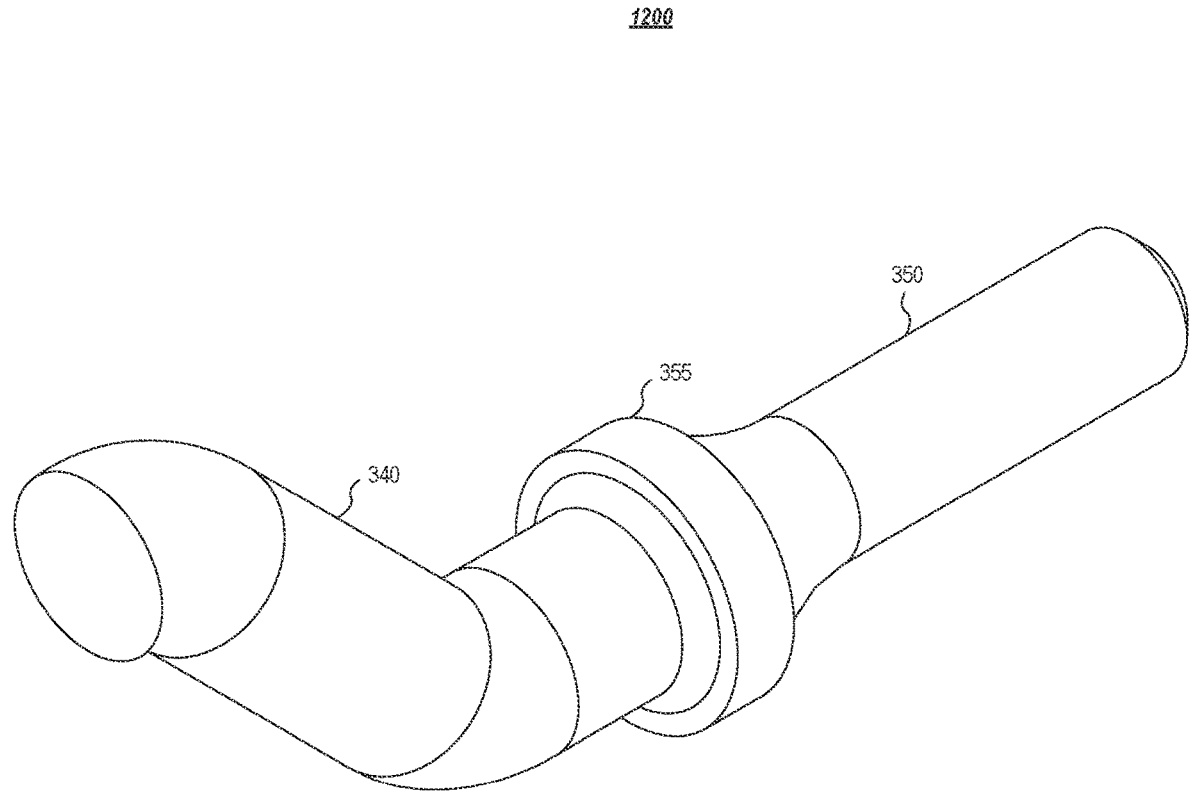
FIG. 12 is a perspective view of a pushing shaft and a driving shaft in accordance with various embodiments of the invention.

FIG. 12 is a perspective view of a pushing shaft and a driving shaft in accordance with various embodiments of the invention. The pushing shaft 340 may be firmly attached to the wedge transporter 330 to drive the wedge transporter 330 for reciprocating motion between a pre-loading position and a loading position. The driving shaft 350 may be driven by an impact hammer, a rotary hammer, or an air hammer. The driving shaft 350 may rotatably couple to the pushing shaft 340 via a bearing 355, such that the driving shaft 350 only passes linear impact to the pushing shaft 340 for wedge pushing during an installation process. In one or more embodiments, the driving shaft 350, the bearing 355, and pushing shaft 340 may be integrated into a single piece as an interface tool for air/power tools, e.g., air hammer. Although the driving shaft 350 and pushing shaft 340 are curved, as shown in FIG. 12, to provide space for air/power tool duration installation, one skilled in the art shall understand these two shafts may be straight as well.

Although embodiments described above are for a wedge transporter with a top-holding transporter guide 332 to hold a wedge 431 from above, one skilled in the art shall understand that the wedge transporter may have different configurations to support a wedge differently during installation. FIG. 13 and FIG. 14 respectively shows top and bottom perspective views of a wedge transporter 1330 with a bottom-holding transporter guide 1332 in accordance with various embodiments of the invention. As shown in FIGS. 13-14, the wedge 1305 is placed in a flipped position compared to the wedge 431 (in FIG. 6A). The wedge transporter 1330 has a bottom-holding transporter guide 1332 that supports the wedge 1305 from below. The wedge transporter 1330 comprises a transporter body 1331, a bottom-holding transporter guide 1332 that supports the wedge 1305 from below, and a transporter guide base 1333. The transporter guide 1332 may have a cross-section matching an open-curve cross-sectional shape of the wedge body such that the transporter guide 1332 may hold the wedge 1305 from below stably during installation.

The transporter body 1331 may have a first wedge wing holder 1334 and a second wedge wing holder 1335 disposed on both sides of the transporter guide 1332. The first wedge wing holder 1334 and the second wedge wing holder 1335 respectively support a first wedge wing 1314 and a second wedge wing 1315 of the wedge 1305 from top, while the transporter guide 1332 holds the wedge 1305 from below. Accordingly, the wedge 1305 may be held from above and below for stable support. In one or more embodiments, the first wedge wing holder 1334 and the second wedge wing holder 1335 may be tapered with a thickness gradually becoming less toward a leading edge such that both wedge wing holders are able to penetrate through small wedge gaps in a stack of wedges. In one or more embodiments, the transporter body 1331 has a tapered section 1339 in proximity of the transporter guide 1332. The tapered section 1339 gradually becomes thinner toward the transporter guide 1332.

In one or more embodiments, the tapered section 1339 may comprise a lip 1336 (also referred to as a retention hook) disposed on top of the transporter guide 1332. When the wedge transporter 1330 pre-loads the wedge 1305, the lip 1336 is right above the top wedge 1305 to provide a top support. Such a top support together with supports from the wedge wing holders 1334/1335 and the transporter guide 1332 jointly offer a comprehensive wedge support. Considering that there will be shaking or vibration inevitably during the wedge installation process, such comprehensive wedge support is very advantageous in holding the wedge stable in position. Furthermore, the tapered section 1339 and the wedge wing holders 1334/1335 may distribute the impact from an impact hammer more uniformly to the wedge. The lip 1336 furthermore supports the wedge 1305 and helps wedge separation from each other, thus facilitating a clean separation of the top wedge 1305 from other wedges in a stack of wedges that are placed upside down.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:
1. A wedge loader comprising:
a wedge magazine comprising a wedge follower to support a stack of wedges;
a loader head comprising:
a cavity to load the wedge magazine;
a wedge transporter input slot; and a wedge exit slot for a top wedge from the stack of wedges to be pushed out for installation, the cavity, the wedge transporter input slot, and the wedge exit slot are connected; and a wedge transporter entering the loader head via the wedge transporter input slot for linear motion to push the wedge out of the loader head, the wedge transporter comprising:

a transporter guide holding the top wedge from above; and a transporter body comprising a tapered section that gradually becomes thinner toward the transporter guide.

2. The wedge loader of claim 1 wherein the transporter guide has a cross-section matching a wedge body of the top wedge to hold the top wedge stably.

3. The wedge loader of claim 1 wherein the transporter body further comprises a first wedge wing holder and a second wedge wing holder disposed on both sides of the transporter guide for side support for the top wedge.

4. The wedge loader of claim 3 wherein the first wedge wing holder and the second wedge wing holder are tapered with a thickness gradually becoming less toward a leading edge such that both wedge wing holders are able to penetrate through a wedge gap in the stack of wedges.

5. The wedge loader of claim 1 wherein the wedge magazine further comprising:

a magazine base pivotably or removably attached to the wedge magazine for opening or sealing the wedge magazine.

6. The wedge loader of claim 1 wherein the wedge follower is pushed or pulled toward the loader head to hold the stack of wedges in position.

7. The wedge loader of claim 1 wherein the wedge transporter further comprises:

a transporter guide base connected to the transporter body, the transporter guide base has a first opening and a second opening.

8. The wedge loader of claim 7 further comprising:

a first linear motion shaft and a second linear motion shaft passing through the first opening and the second opening for linear motion in a first shaft slot and a second shaft slot that are disposed in the loader head.

9. The wedge loader of claim 7 further comprises:

a pushing shaft connected to the transporter guide base to drive the wedge transporter for a reciprocating motion; and a driving shaft rotatably coupled to the pushing shaft.

10. The wedge loader of claim 1 wherein the tapered section comprises a lip disposed beneath the transporter guide for holding the top wedge from below and for separating the wedge from the wedge stack during wedge installation.

11. A system for automatic wedge loading comprising:

a wedge comprising:

a tapered wedge head that narrows towards a leading wedge end; and a wedge body that has an open-curve cross-sectional shape, the wedge body has a first longitudinal wing and a second longitudinal wing that extend outward from the wedge body; and a wedge transporter to support the wedge for wedge installation, the wedge transporter comprising:

a transporter guide holding the wedge from above; and a transporter body comprising a tapered section that gradually becomes thinner toward the transporter guide, the tapered section comprises a first wedge wing holder and a second wedge wing holder disposed on both sides of the transporter guide for side support for the top wedge.

12. The system of claim 11 wherein the first longitudinal wing and the second longitudinal wing respectively have a first tail protrusion and a second tail protrusion, which protrude cross-sectionally beyond the first and second longitudinal wings.

13. The system of claim 11 wherein the wedge body further comprising:

an opening in proximity of the tapered wedge head; and a clip protruding from the opening beyond the wedge body in a normal state and extending in a direction away from the tapered wedge head.

14. The system of claim 11 wherein the transporter guide has a cross-section matching the open-curve cross-sectional shape of the wedge body to hold the wedge stably.

15. The system of claim 11 wherein the transporter guide has a tapered tip to ease an initial pre-loading of the wedge.

16. The system of claim 11 wherein the first wedge wing holder and the second wedge wing holder are tapered with a thickness gradually becoming less toward a leading end.

17. The system of claim 11 wherein the wedge transporter further comprises:

a transporter guide base connected to the transporter body, a first linear motion shaft and a second linear motion shaft are attached to the transporter guide base to enable a linear motion for the wedge transporter.

18. The system of claim 17 further comprising:

a loader head comprising:

a cavity to receive a stack of wedges, the wedge supported by the wedge transporter is on the top of the stack of wedges;

a wedge transporter input slot to receive the wedge transporter;

a wedge exit slot for the wedge to be pushed out for installation, the cavity, the wedge transporter input slot, and the wedge exit slot are connected; and a first shaft slot and a second shaft slot disposed in the loader head to respectively receive the first linear motion shaft and the second linear motion shaft to enable the linear motion for the wedge transporter.

19. The system of claim 18 further comprising:

a wedge magazine comprising a wedge follower to support the stack of wedges, the wedge follower is pushed or pulled toward the loader head to hold the stack of wedges in position.

20. The system of claim 11 wherein the tapered section comprises a lip disposed beneath the transporter guide for holding the top wedge from below and for separating the wedge from the wedge stack during wedge installation.

* * * * *